(12) United States Patent
Bowler

(10) Patent No.: US 7,526,557 B2
(45) Date of Patent: Apr. 28, 2009

(54) SYSTEM AND METHOD FOR TRANSFERRING DATA IN HIGH LATENCY FIREWALLED NETWORKS

(75) Inventor: Ken Bowler, Manotick (CA)

(73) Assignee: Signiant, Inc., Kanata, Ontario (CA)

( * ) Notice: Subject to any disclaimer, the term of this patent is extended or adjusted under 35 U.S.C. 154(b) by 1015 days.

(21) Appl. No.: 10/879,586

(22) Filed: Jun. 30, 2004

(65) Prior Publication Data

US 2006/0047824 A1    Mar. 2, 2006

(51) Int. Cl.
*G06F 15/16* (2006.01)
*G06F 17/00* (2006.01)

(52) U.S. Cl. .......................... 709/227; 709/219; 726/11

(58) Field of Classification Search ......... 709/227–229, 709/217–219; 726/11–13
See application file for complete search history.

(56) References Cited

U.S. PATENT DOCUMENTS

| | | | | |
|---|---|---|---|---|
| 5,319,644 | A | | 6/1994 | Liang .......................... 370/85.5 |
| 5,519,863 | A | | 5/1996 | Allen et al. .................. 395/650 |
| 5,552,776 | A | | 9/1996 | Wade et al. ............. 340/825.31 |
| 5,796,966 | A | | 8/1998 | Simcoe et al. .............. 395/311 |
| 5,999,979 | A | * | 12/1999 | Vellanki et al. ............. 709/232 |
| 6,006,019 | A | | 12/1999 | Takei ..................... 395/200.54 |
| 6,064,656 | A | | 5/2000 | Angal et al. ................. 370/254 |
| 6,085,251 | A | * | 7/2000 | Fabozzi, II ................... 709/230 |
| 6,128,653 | A | * | 10/2000 | del Val et al. ............... 709/219 |
| 6,163,543 | A | | 12/2000 | Chin et al. .................. 370/400 |
| 6,163,809 | A | | 12/2000 | Buckley ...................... 709/237 |
| 6,192,412 | B1 | * | 2/2001 | Cantoral et al. ............. 709/236 |
| 6,199,109 | B1 | | 3/2001 | Reder et al. ................. 709/224 |
| 6,219,706 | B1 | | 4/2001 | Fan et al. .................... 709/225 |
| 6,298,061 | B1 | | 10/2001 | Chin et al. .................. 370/400 |
| 6,396,511 | B1 | | 5/2002 | Karino ........................ 345/744 |
| 6,557,122 | B1 | | 4/2003 | Sugauchi et al. .............. 714/57 |
| 6,600,812 | B1 | | 7/2003 | Gentillin et al. ............... 379/45 |
| 6,701,437 | B1 | * | 3/2004 | Hoke et al. .................... 726/15 |
| 6,718,361 | B1 | | 4/2004 | Basani et al. ............... 709/201 |
| 6,760,861 | B2 | * | 7/2004 | Fukuhara et al. ............... 714/4 |

(Continued)

OTHER PUBLICATIONS

Premo, Rita, "A Picture-Perfect Travel Log; Working Wise; Avaya Inc.; Brief Article", Aug. 1, 2002, *Security Management*, No. 8, vol. 46, p. 25, ISSN: 0145-9406, pp. 1-3.

(Continued)

*Primary Examiner*—Joseph E Avellino
(74) *Attorney, Agent, or Firm*—Pillsbury Winthrop Shaw Pittman LLP

(57) ABSTRACT

A system and method are provided for establishing multiple parallel connections between a client and a server on a single server port. Data may be transferred on the multiple parallel connections between the server and the client through an opening in a network firewall that corresponds to the single server port. A control process may accept N connection requests from a client then transfer each accepted connection to a relay process that manages that connection. Each relay process may relay data between the server and the client via the single server port. A single collective data transfer may be executed on the N parallel connections, thereby increasing throughput and data transfer rates. If the data transfer rate is primarily limited by network latency, using N parallel connections provides the advantage of increasing the data transfer rate by approximately a factor of N.

8 Claims, 3 Drawing Sheets

U.S. PATENT DOCUMENTS

| | | | | |
|---|---|---|---|---|
| 6,763,384 | B1 | 7/2004 | Gupta et al. | 709/224 |
| 6,823,373 | B1 | 11/2004 | Pancha et al. | 709/219 |
| 7,103,889 | B2 * | 9/2006 | Hiltgen | 719/317 |
| 7,139,811 | B2 * | 11/2006 | Lev Ran et al. | 709/217 |
| 7,406,533 | B2 * | 7/2008 | Li et al. | 709/236 |
| 2002/0032769 | A1 | 3/2002 | Barkai et al. | 709/224 |
| 2002/0049834 | A1 | 4/2002 | Molnar | 709/219 |
| 2002/0099729 | A1 | 7/2002 | Chandrasekaran et al. | 707/203 |
| 2002/0104008 | A1 | 8/2002 | Cochran et al. | 713/200 |
| 2002/0116485 | A1 | 8/2002 | Black et al. | 709/223 |
| 2002/0116616 | A1 | 8/2002 | Mi et al. | 713/168 |
| 2002/0165961 | A1 | 11/2002 | Everdell et al. | 709/225 |
| 2002/0169694 | A1 | 11/2002 | Stone et al. | 705/27 |
| 2002/0199000 | A1 * | 12/2002 | Banerjee | 709/227 |
| 2003/0014482 | A1 | 1/2003 | Toyota et al. | 709/203 |
| 2003/0028498 | A1 | 2/2003 | Pallante | 705/78 |
| 2003/0046103 | A1 | 3/2003 | Amato et al. | 705/1 |
| 2003/0051026 | A1 | 3/2003 | Carter et al. | 709/224 |
| 2003/0056096 | A1 | 3/2003 | Albert et al. | 713/168 |
| 2003/0065950 | A1 | 4/2003 | Yarborough | 713/201 |
| 2003/0120822 | A1 | 6/2003 | Langrind et al. | 709/251 |
| 2003/0126195 | A1 | 7/2003 | Reynolds et al. | 709/203 |
| 2003/0212806 | A1 | 11/2003 | Mowers et al. | 709/229 |
| 2003/0216958 | A1 | 11/2003 | Register et al. | 705/14 |
| 2004/0093420 | A1 * | 5/2004 | Gamble | 709/231 |
| 2004/0122888 | A1 * | 6/2004 | Carmichael | 709/200 |
| 2005/0086359 | A1 * | 4/2005 | Banerjee et al. | 709/232 |
| 2005/0251575 | A1 * | 11/2005 | Bayardo et al. | 709/227 |
| 2005/0261796 | A1 * | 11/2005 | Shen | 700/121 |

OTHER PUBLICATIONS

"ISOCOR Releases Industry's Most Powerful Message Server", Nov. 14, 1994, *M2 Presswire*, pp. 1-3.

Waldrop, Clarence, et al., "Making a TCP/IP Connection Through a Firewall", Candle Advanced Technical Corner Tips and Tricks, copyright 2003, 7 pages.

* cited by examiner

SYSTEM AND METHOD FOR TRANSFERRING DATA IN HIGH LATENCY FIREWALLED NETWORKS

FIELD OF THE INVENTION

The invention generally relates to systems and methods of increasing data transfer rates in high-latency networks with firewalls.

BACKGROUND OF THE INVENTION

Users of networked computer systems desire to transfer data reliably and efficiently to and from other networked computer systems. The Transfer Control Protocol/Internet Protocol (TCP/IP) provides the ability to send and receive data to and from various TCP/IP networked computer systems. File transfer protocol (FTP) is one example of a service that runs on a TCP/IP networked computer system. FTP enables large amounts of data to be transferred from a client side to a server side, or vice versa.

Services such as FTP typically initiate communication on a reserved communication port on the server. The reserved communication port is sometimes referred to as a "well-known port." For example, a user of a client machine may request a connection to an FTP server on the well-known port to transmit/receive data to/from the FTP server. The FTP server may respond by establishing a unique connection between the client and the FTP server. A unique connection is determined by an IP address of the client, an IP address of the server, and the port on the server being accessed.

Firewalls are used to secure their hosts by screening data transfers between their hosts and their user community. Conventional firewalls are typically programmed to restrict inbound traffic for a particular set of users and/or a particular set of hosts and/or ports. Firewalls decide to pass data based on the type of protocol used for the data transfer, the destination IP address, and/or source IP address.

Most firewalls are programmed to pass data on any connection to a well-known port on a server. For example, if a server has a well-known port for an FTP service, a firewall typically passes or otherwise permits data transfers to and from the well-known FTP port. Some services use a single connection to transfer all the data to/from the server. For large transfers of data occurring on a single connection, throughput is limited to that of a single connection.

"Latency" refers to the amount of time it takes a block of data to get from one designated point to another, in a network. Conventional systems have attempted to address a problem of slow data transfer in high latency firewalled networks by establishing multiple connections between the client and the server. Some conventional systems establish these multiple connections by allocating ports on a server dynamically. This process typically involves establishing multiple connections between the client and the server, in real time, by assigning each communication channel a new server port. A firewall in the network typically permits the connections to be established provided the firewall is aware of the protocol being used. For example, the firewall may inspect the protocol information associated with a data transfer in order to determine what new ports should be allocated. Thus, the firewall must be able to recognize the protocol information in order to assign the communication channel a port on the server.

Using dynamic port allocation, the firewall opens a corresponding communication port in the firewall not otherwise left open for each of the unique connections established between the client and the server. For example, a client may request a large transfer of data from a server, and the client and the server may negotiate to execute the transfer on three parallel connections between the client and the server. As a result, the firewall would open three corresponding communication ports in the firewall for passing the data channeled on each connection and close them once the transfer is complete.

Dynamic port allocation is problematic because it leaves the firewall exposed to security risks at three corresponding communication ports. Because the firewall decides to open three corresponding ports to pass data, the part of the network being protected by the firewall is more vulnerable than when the data transfer is being executed on a single connection.

Because some firewalls use dynamic port allocation to regulate data traffic, the manufacturers of firewalls-need to be "aware" of the protocols being used to transfer data through the firewall. More specifically, conventional firewalls must be able to recognize and understand protocol information as it passes through the firewall in order to determine what new ports should be allocated. This results in compatibility problems with installed, or otherwise existing, firewalls when new protocols are created.

These and other drawbacks exist.

SUMMARY OF THE INVENTION

The invention generally relates to a system and method of decreasing latency and increasing data transfer rates in a network including a firewall.

According to one aspect of the invention, multiple parallel connections may be established between a client and a server using a single server port reserved for communication with a client. Data may be transferred on the multiple parallel connections between an operating system client process and an operating system server process, for example.

According to another aspect of the invention, the multiple parallel connections may all be established at the server on a communication port that is typically open through the firewall including, for example, a well-known port (i.e. a port to which the firewall typically permits access). This arrangement may be advantageous, because it enables data transferred on each of the multiple parallel connections to pass through the corresponding opening in the firewall. Because multiple connections may be passed through a single corresponding opening in the firewall, the problems associated with overexposing the protected network at multiple open ports in the firewall may be avoided. Additionally, because the multiple connections may be established on the same communication port at the server, the firewall need not allocate new ports on the server for the data transfer.

According to another aspect of the invention, N parallel connections between a communication port at a server and a client may be established. The communication port may be a well-known port or a port reserved for communication with the client. A single collective data transfer may be executed on the N parallel connections, thereby increasing throughput and data transfer rates. If the data transfer rate is primarily limited by network latency, using N parallel connections provides the advantage of increasing the data transfer rate by approximately a factor of N. The number of connections (N) may be determined by the client, by the server, or may be negotiated between the client and the server.

According to another aspect of the invention, the N connections may be accepted by a data traffic manager at the server. Typically, a firewall allows any number of connections to be initiated between a client and a server. However, a single process on the server typically receives connections on a given port at the server at any given time. In various embodiments, a single process on the server side may "listen" for connection requests from the client on a communication port, including a well-known port at the server. Once a connection is accepted by this process, the connection may be transferred or "handed off" to another, typically a new process on the server side. In the meantime, the single process on the server side continues to listen for new connection requests. This new server process that receives the connection on the communication port may be a "child" process created by the single process. Thus, a connection between the client and the communication port at the server may remain active, while other connections between the client and the single process on the server side on the communication port are being initiated.

According to another aspect of the invention, the data traffic manager may include a control process. The control process may listen on a communication port for connection requests from the client. Once a connection is established, the control process may transfer the connection to another server process that maintains and/or manages the active connection between the client and the communication port at the server. The control process may continue to listen on the communication port for another connection request from the client. The invention may repeat these operations N times to establish N parallel connections between the client and the communication port at the server. Accordingly, the firewall passes any data channeled on these parallel connections, because the firewall "sees" N connections to the server on the same communication port.

According to another aspect of the invention, the control process may accept N parallel connections to the client on the communication port, which may include a well-known port at the server. Because more than one connection may be accepted by the control process at a given time, the control process need not transfer a connection to the client to another server process before listening on the communication port for other connection requests.

According to another embodiment, the control process may maintain and/or manage the N connections to client on the communication port, without transferring each connection to a new process on the server side. For example, the control process may accept N connections from the client on the communication port at the server. The control process may then establish N local connections to a specified server process, to which the client has requested access. The control process may relay data between the specified server process and the client via the communication port on the server.

According to another aspect of the invention, a data traffic manager, which may include a control process, may-manage connections to the server and the server processes. A client may contact the control process of the data traffic manager and request N connections to a server or specified server process. The control process may contact an existing server process, or create a new server process. The control process may inform the server process that the client is requesting N connections to the server process. In response to the control process, the server process may transmit a list of N available server ports on which the client can initiate connections to the server.

According to another aspect of the invention, once the client has received a list of N available ports from the specified server process, the client may contact the control process, which is listening at the server on the communication port, to request a first connection to a selected first one of the available ports. The control process may then accept the first connection to the client on the communication port at the server. Once the first connection is accepted, a first relay process may be created by the control process. The control process may then transfer the first connection between the client and the control process on the communication port to the first relay process. The first relay process may be a "child" process of the control process, and the connection may be transferred by inheritance, for example. The first relay process may manage the active first connection, and the control process may then begin listening or continue listening on the communication port for other connection requests from the client.

According to another aspect of the invention, the first relay process may be an operating system process running at the server. The first relay process may establish a new local connection to the selected first one of the available ports at the server in order to relay data to and from the specified server process. Once this connection is established, the first relay process is connected to 1) the client via the communication port at the server and 2) the specified server process on the selected first one of the available ports. The first relay process may relay data between the selected first one of the available ports at the specified server process and the client via the communication port at the server.

According to another aspect of the invention, the client may contact the control process, which is listening on the communication port at the server, to request a second connection to the specified server process on a selected second one of the available ports. The control process may then accept the second connection to the client on the communication port at the server. Once the second connection is accepted, a second relay process may be created by the control process. The control process may transfer the second connection between the client and the control process to the second relay process. The second relay process may be a "child" process of the control process, and the connection may be transferred by inheritance, for example. The second relay process may manage the active second connection, and the control process may then begin listening or continue listening on the communication port for other connection requests from the client.

According to another aspect of the invention, the second relay process may be an operating system process running at the server. The second relay process may establish a new local connection to the selected second one of the available ports at the server in order to relay data to and from the specified server process. Once this connection is established, the second relay process is connected to 1) the client via the communication port at the server and 2) the specified server process on the selected second one of the available ports. The second relay process may relay data between the selected second one of the available ports at the specified server process and the client via the communication port at the server.

According to another aspect of the invention, the control process may continue to listen for other connection requests from the client. The control process may ultimately accept N parallel connections and creates N relay processes. A single collective data transfer may be executed on the N connections in parallel, thereby increasing throughput and data transfer rates.

According to another aspect of the invention the relay processes may be created to pass data to or from a specified server process to which the client has requested access. These relay processes may be newly created "child" processes of the control process that accepted the connection to the client on the communication port at the server. The relay processes provide the advantage of "freeing" the control process from the burden of continuously passing data between the communication port and the specified server process on the N parallel connections.

According to another aspect of the invention, the relay processes maintain N active parallel connections on the communication port at the server. Thus, the specified server process may pass the data to the N relay processes, which subsequently pass the data to the client on the N active parallel connections via the communication port at the server. The firewall may pass the data transferred on the active N parallel connections, because the connections all originate on the same communication port at the server. Because all the connections originate on the communication port at the server, the firewall does not need to allocate ports dynamically, therefore, N multiple parallel connections may be established without the firewall having any knowledge of the underlying protocols. Accordingly, the firewalls that may be used with the invention are not required to recognize the protocols used to transfer data between a client and a server.

According to another aspect of the invention, each one of the N local ports on the specified server process may transmit data on N parallel connections to a corresponding local port on each of the N relay processes; and the N relay processes may relay the data to the client via the communication port at the server.

According to another aspect of the invention, each of the N relay process s may receive data on each of the N parallel connections from the client via the communication port at the server. The N relay processes may relay the data from the N local ports on the relay processes to the N local ports on the specified server process.

According to another aspect of the invention, if the data transfer rate is primarily limited by network latency, using N parallel connections provides the advantage of transferring data at a rate approaching N times faster than if the client and the specified server process had established a single connection for the data transfer. A single collective data transfer may be executed on the N connections in parallel, thereby increasing throughput and data transfer rates. This may be especially advantageous in larger data transfers. In some embodiments of the invention, the data may be split into smaller chunks and passed over the N parallel connections.

According to another aspect of the invention, the data traffic manager may be used with any type of existing or subsequently developed protocol for transferring data. Unlike dynamic port allocation, the invention may use the same communication port to initiate all N connections; therefore the firewall need not be aware of the protocol being used to transfer the data. As a result, new protocols may be created and used with existing firewalls that would not otherwise operate with newer protocols.

It is to be understood that the invention is not limited to data transfers occurring in a specific network direction (i.e. client to server, server to client, etc.), but encompasses any data transfer in a network including a firewall.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention. In the drawings.

DETAILED DESCRIPTION OF THE PREFERRED EMBODIMENTS

Figure 1:
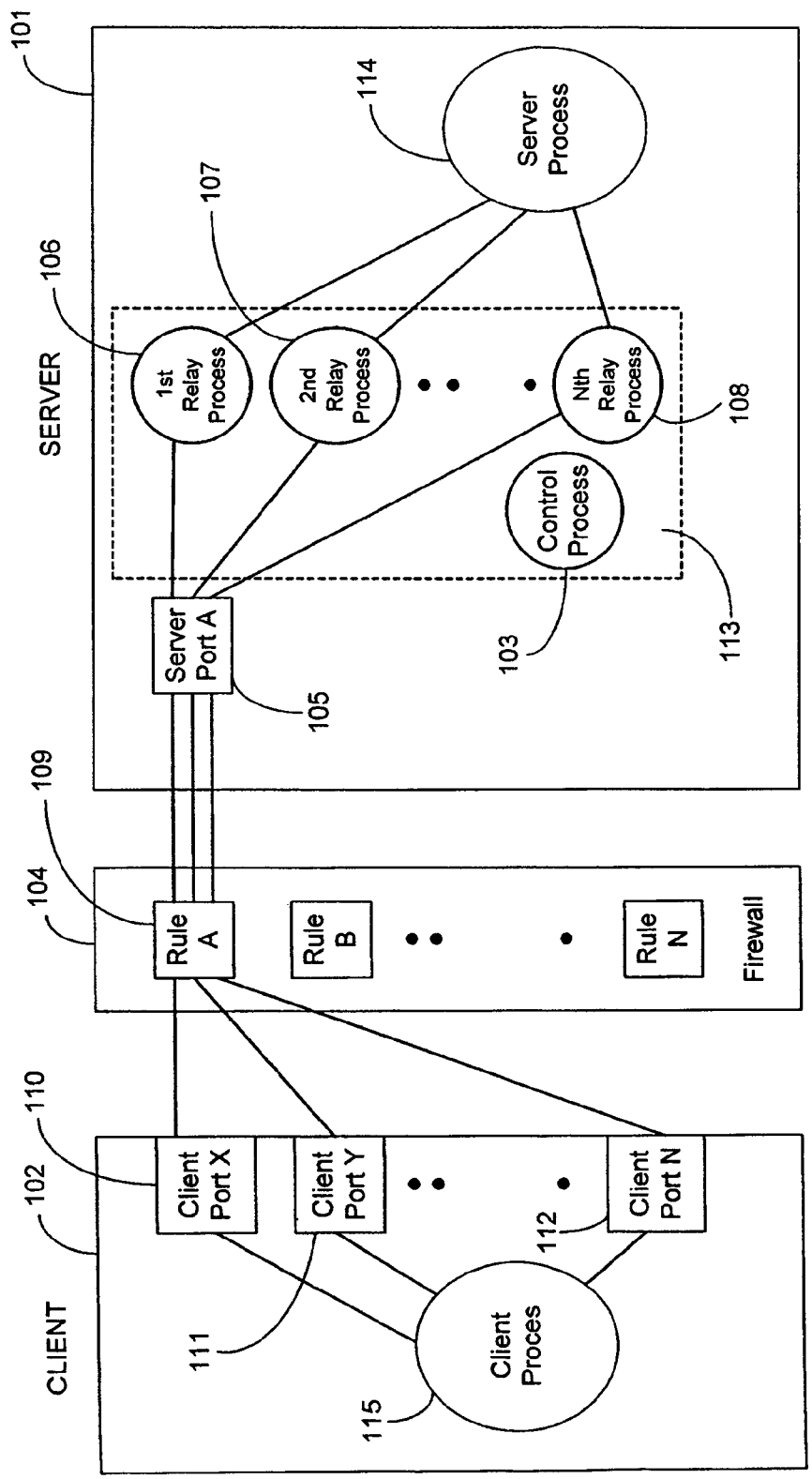
FIG. 1 is a schematic diagram of a system for increasing data transfer rates according to various embodiments of the invention.

The invention generally relates to a system and method that compensates for latency and increases data transfer rates in a network that includes a firewall. FIG. 1 is a schematic diagram of a system for increasing data transfer rates according to one embodiment of the invention. For purposes of illustration, the data transfer has been depicted to occur in the server-to-client direction. However, it is to be understood that the invention is not limited to data transfers occurring in a particular network direction (i.e. client to server, server to client, etc.), but may encompass various data transfers in networks including a firewall. While described below as a well-known port at the server, the following description applies generally to all communication ports in a network.

According to the various embodiments of the invention, multiple parallel connections may be established between client 102 and server 101 using a single server communication port 105, which may be a well-known port that is accessible through firewall 104.

The source and the target of the data transfer may also include an operating system client process 115 and an operating system server process 114. Firewall 104 may be a conventional firewall that includes various "rules" for determining whether to pass data through the firewall or provide access to various addresses. These rules may include for, for example, instructions to firewall 104 to pass certain data being transferred to/from certain ports on server 101. In the embodiment depicted in FIG. 1, rule A 109 instructs firewall 104 to pass data transferred between client 102 and server 101 via server port A 105.

The multiple parallel connections may all be established at server 101 on server port A 105. This arrangement may be advantageous, because it enables data transferred on each of the multiple parallel connections to pass through opening 109 in firewall 104 which corresponds to server port A 105. Because these multiple connections may be passed through a single corresponding opening 109 in firewall 104, the configuration of firewall 104 is simplified and network security is increased.

First relay process 106 and second relay process 107 through Nth relay process 108 each manage an active connection with client 102 at server 101 on server port A 105. The relay processes manage data transmitted/received between server process 114 and client 102. Each of the multiple parallel connections may include a local server connection from server process 114 to a relay process (106-108) and a connection from a client process 115 to a relay process. For example, second relay process 107 manages data transferred between server process 114 on server port A 105 and client process 115 on client port Y 111.

A single process on the server typically receives connections on a given port at the server at any given time. In other words, one process (e.g. control process 103) on server 101 may "listen" for connection requests from client 102 on a well-known port at server 101. Additionally, nearly all firewalls allow more than one connection between a client and a given port at a server to remain active. Thus, a connection between client 102 and control process 103 on server port A 105 at server 101 may remain active, while other connections between client 102 and control process 103 on server port A 105 are being initiated. Once a connection is initiated, control process 103 may create a new "child" process and "hand off" or transfer the connection to the newly created child process.

Because conventional operating systems typically allow a single process on the server to "listen" for a connection request at any given time, some embodiments of the invention repeat the following operations N times to generate N parallel connections between client 102 and a specified server process (e.g. 114) at server 101 on well known-port 105: (1) establish a connection between client 102 and control process 103, which is listening on well-known port 105 at server 101; (2) create a relay process (e.g. 106, 107, and 108) that may be a child process of control process 103; (3) transfer the connection between client 102 and control process 103 on well-known port 105 at server 101 to a relay process; and (3) connect the relay process to specified server process 114 to which client 102 requested a connection on an available server port.

In some embodiments, data traffic manager 113 may accept the N connections between client 102 and server 101. Data traffic manager 113 may include control process 103 relay processes, 106-108. Control-process 103 may listen on well-known port 105 at server 101 for connection requests from client 102. Once a connection is established, control process 103 may transfer the connection to another server process (e.g. one of relay processes 106-108) that manages the active connection between client 102 and well-known port 105. Relay processes 106-108 may be child processes of control process 103. Control process 103 may continue to listen on well-known port 105 for another connection request. Control process 103 may repeat these operations N times to generate N parallel connections between client 102 and well-known port 105 at server 101. Accordingly, firewall 104 passes any data channeled on these parallel connections, because firewall 104 "sees" N connections to server 101 on well-known port 105. In a network where latency is the primary factor limiting the data transfer rate, using N parallel connections provides the advantage of increasing the data transfer rate by a factor approaching N.

One advantage of the invention is that the data traffic manager 113 may be used with any type of existing or subsequently developed protocol for transferring data. Unlike dynamic port allocation, various embodiments of the invention may use the same communication port to initiate all N connections; therefore firewall 104 need not be aware of the protocol being used to transfer the data. As a result, new protocols may be created and used with existing firewalls that would not otherwise operate with newer protocols. These protocols can be implemented using various software programs located at the client and the server without need to reconfigure the firewall deployed there between.

Figure 2:
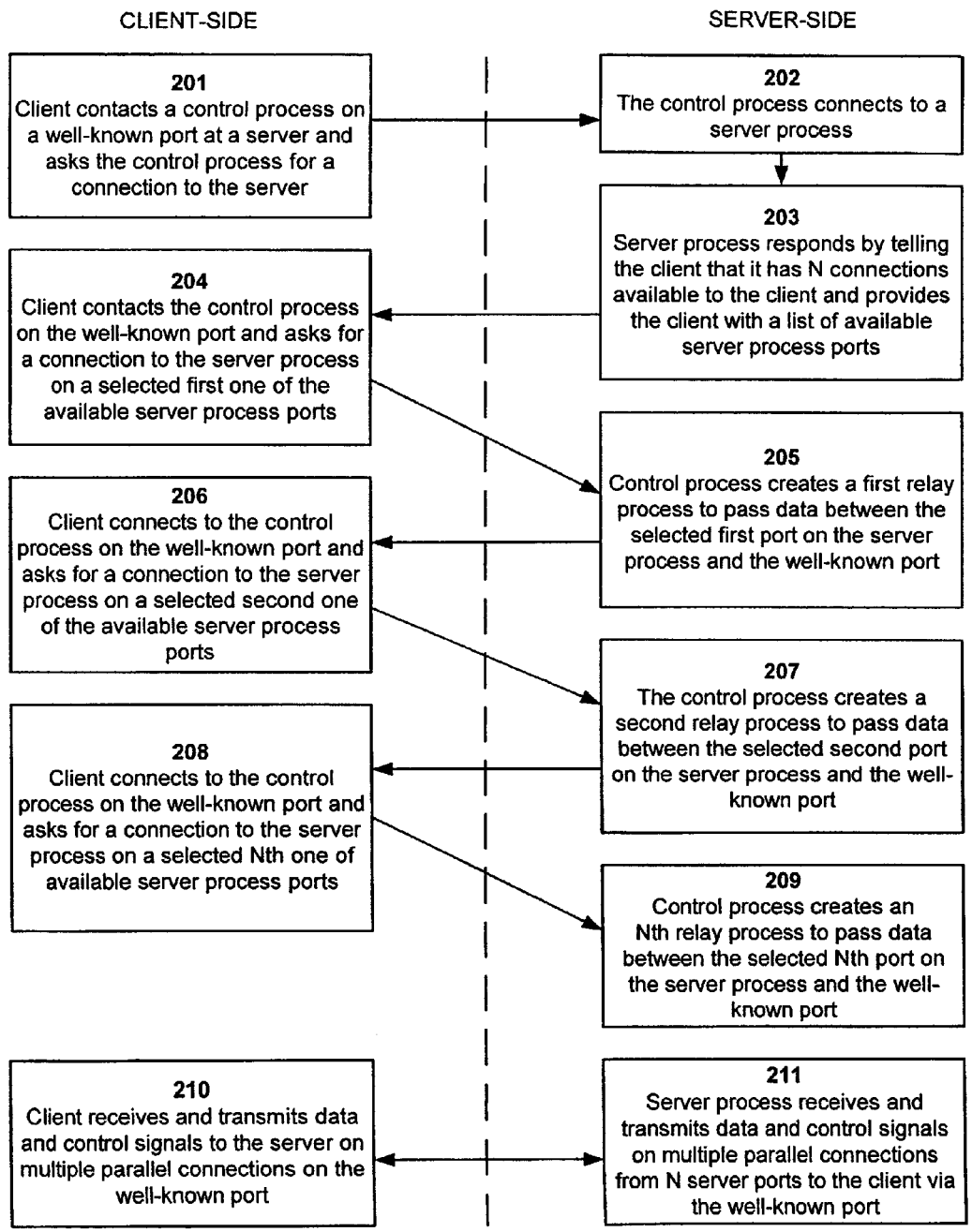
FIG. 2 illustrates a process for establishing multiple parallel connections between a client and a server according to various embodiments of the invention.

FIG. 2 illustrates a process for establishing multiple parallel connections between client 102 and server 101 via well-known port 105 according to one embodiment of the invention. In an operation 201, client 102 contacts control process 103, which is listening at server 101 on well-known port 105. Client 102 may ask control process 103 for a connection to an existing or non-existing server process 114. The number of connections (i.e. N) to be established may be determined by client 102 or server 101. The number of connections may also be established by negotiations between the client and the server.

In an operation 202, control process 103 may contact an existing server process 114, or create a new server process, in response to the request from client 102. Control process 103 may inform server process 114 that client 102 is requesting N connections to server process 114.

In an operation 203, server process 114 may transmit a list of N available server ports on which client 102 can initiate connections to server process 114, in response to control process 103. The N available server ports may be ports on server 101.

In an operation 204, once client 102 has received a list of N available ports from server process 114, client 102 may contact control process 103 to request a first connection to a selected first one of the N available server ports. Control process 103 may then accept the first connection to client 102 on well-known port 105 at server 101.

In an operation 205, once the first connection is accepted, first relay process 106 may be created by control process 103. First relay process 106 may be a child of control process 103. In this manner, control process 103 may then transfer the first connection between client 102 and control process 103 to first relay process 106. This connection may be transferred, for example, by inheritance. First relay process 106 then establishes a connection to server process 114 on a selected first one of the N available server ports. First relay process 106 manages the first connection and relays data between the selected first one of the available server ports and client 102. First relay process 106 provides the advantage of "freeing" control process 103 from having to continuously pass data between the first one of the available server ports on the server process 114 and client 102 via well-known port 105. Control process 103 may then continue listening on well-known port 105 for other connection requests from client 102.

In an operation 206, client 102 may contact control process 103, which is listening on well-known port 105 at server 101, to request a second connection to server process 114 on a selected second one of the available ports. Control process 103 may then accept the second connection to client 102 on well-known port 105 at server 101.

In an operation 207, once the second connection is accepted, second relay process 107 may be created by control process 103. Second relay process 107 may also be a child of control process 103. In this manner, control process 103 may transfer the second connection between client 102 and control process 103 to second relay process 107. Second relay process 107 then establishes a connection to server process 114 on a selected second one of the N available server ports. Second relay process 107 manages the active second connection on well-known port 105 and relays data between the selected second one of the available server ports and client 102. Second relay process 107 provides the advantage of "freeing" control process 103 from having to continuously pass data between the second one of the available server ports on server process 114 and client 102 via well-known port 105. Control process 103 may then continue listening on well-known port 105 for other connection requests from client 102.

In operations 208 and 209, N-2 connections are established between client 102 and server process 114 at server 101 on well-known port 105 in a similar manner that the first and second connections were established in operations 204-207.

In operations 210 and 211, client 102 transmits/receives data through firewall 104 on N multiple parallel connections to/from well-known port 105 at server 101. Similarly, server process 114 transmits/receives data on well-known port 105 at server 101. Data received at well-known port 105 is relayed to the corresponding selected available ports; and data transmitted from the corresponding selected available ports is relayed on well-known port 105 at server 101 to client 102.

Figure 3:
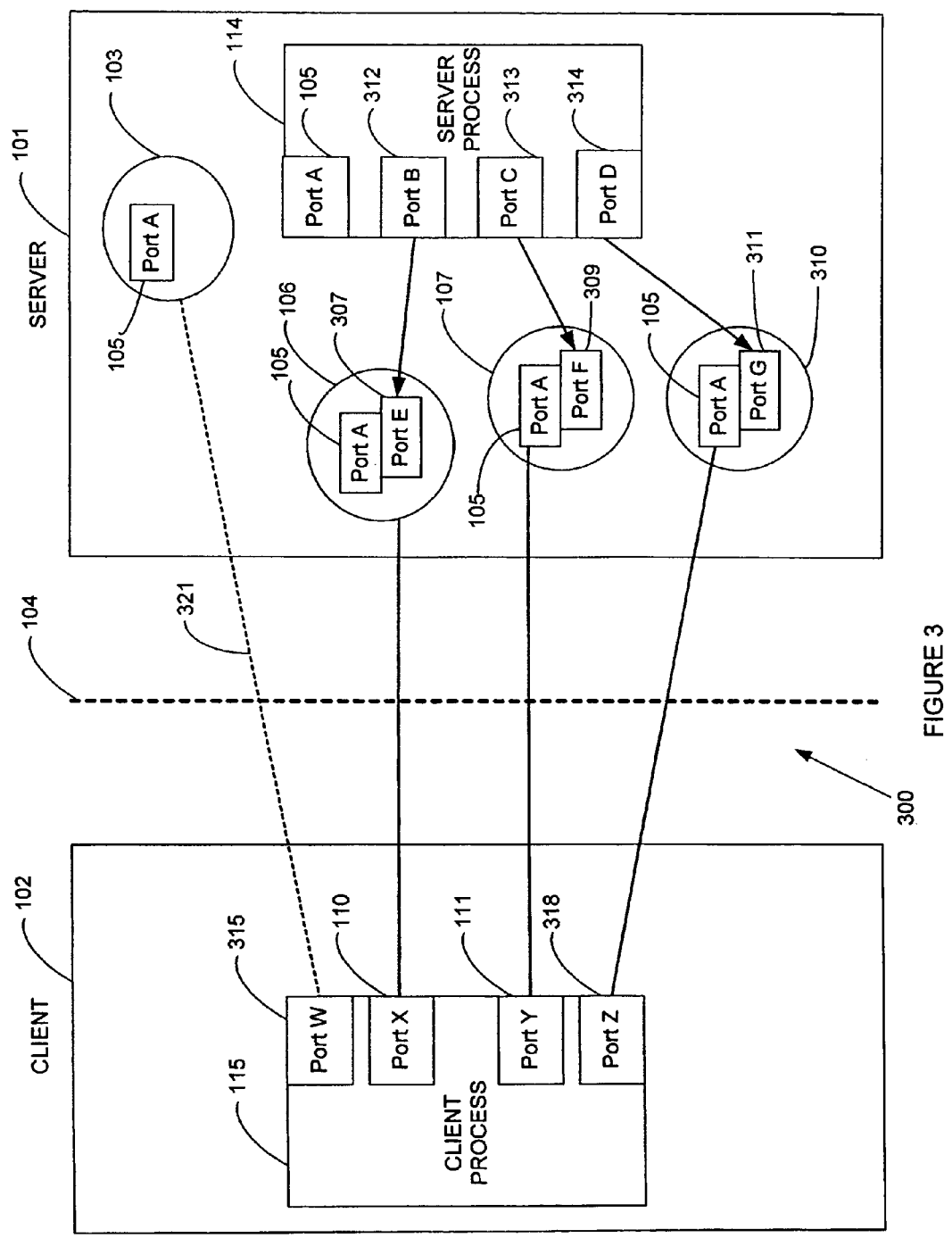
FIG. 3 illustrates a system for increasing data transfer rates including relationships between local ports at the server according to various embodiments of the invention.

FIG. 3 illustrates a system for increasing data transfer rates including relationships between local ports at the server according to various embodiments of the invention. The relay processes 106, 107, and 310 are created to transfer data between a server process 114 to which the client 102 has requested access, as described above. In this example, relay processes 106, 107, and 310 maintain three active parallel connections on the well-known port 105 at server 101. As would be apparent, any number of relay processes may be used to manage the active parallel connections. Thus, server process 114 may pass the data to the three relay processes 106, 107, and 310, which subsequently pass the data to client 102 on the three active parallel connections via well-known 105 port at server 101.

Server process 114, control process 103, and relay processes 106, 107, and 310 may be operating system processes running at server 101, as would be apparent. Similarly, client process 115 may be an operating system process running at client 102, as would also be apparent.

As described above, the relay processes 106, 107, and 310 receive active connections from control process 103. In response to receiving an active connection to client 102 on well-known port 105 at server 101, relay processes 106, 107, and 310 may establish new local connections to the selected ones of the available ports 312-314 at server 101 in order to relay data to/from server process 114.

For example, first relay process 106 may manage an active connection to client port X 110 via server port A 105. First relay process 106 may initiate a local connection between server port B 312 on server process 114 and server port E 307. First relay process 106 may then relay data between client 102 and server 101 via server port A 105, which in some embodiments is a well-known port. Once this connection is established, first relay process 106 is connected to 1) client 102 at client port X 110 via well-known port A 105 at server 101 and 2) server process 114 on server port B 312. First relay process 106 may relay data between server port B 312 at server process 114 and client 102 via well-known port A 105 at server 101. Firewall 104 passes the data transferred on the active connection between server port B 312 and client port X 110, as discussed above.

In a similar manner, a second relay process 107, may initiate a local connection between server port C 313 on server process 114 and server port F 309. Once this connection is established, second relay process 107 is connected to 1) client 102 at client port Y 111 via well-known port A 105 at server 101 and 2) server process 114 on local server port C 313. Second relay process 107 may relay data between server port C 313 at server process 114 and client 102 via well-known port A 105 at server 101. Firewall 104 passes the data transferred on the active connection between server port C 313 and client port Y 111, because the connection originated on well-known port A 105 at server 101.

Control process 103 may continue to accept other connections between client 102 and server process 114. The dotted line 321 between the client and control process 103 illustrates that control process 103 may continue to actively listen for additional connection requests then pass, by inheritance, each additional connection to a relay process. Control process 103 may ultimately accept N (in this example three) parallel connections and create N relay processes. As a result, the system 300 may transfer data through firewall 104 on N connections to/from N local server process ports to the client via the same well-known port 105 on the server.

In some embodiments, the N local ports on the server process may transmit data on N parallel connections to a corresponding local port on each of the N relay processes; and the N relay processes may relay the data to the client via the well-known port at the server. Similarly, the N relay processes may receive data on each of the N parallel connections from the client via the well-known port at the server. The N relay processes may then relay the data from the N local ports on the relay processes to the N local ports on the server process.

Once N connections are established between a server process and the client, data may be transferred at a rate approaching N times faster than if the client and the server process had established a single connection for the data transfer. A single collective data transfer may be executed on the N connections in parallel, thereby increasing throughput and data transfer rates. This may be especially advantageous in larger data transfers. In various embodiments of the invention, the data may be split into smaller chunks and passed over the N parallel connections.

In some embodiments, the control process may relay data to/from a specified server process from/to a client on N connections via the well-known port without creating relay processes. In these embodiments, the control process may accept N connections from the client on the well-known port, then establish N local connections to the specified server process. Data may then be relayed between the client and the specified server process by the control process via the well-known port at the server.

Again, it is to be understood that the invention is not limited to data transfers occurring in specific network direction (i.e. client to server, server to client, etc.), but encompasses any data transfer in a network including a firewall.

Various embodiments of the invention may be implemented to increase data transfer rates to/from any network entity. In addition, various embodiments of the invention may be used at the client side or at the server side or at a combination thereof.

It should also be understood that various embodiments of the invention may be implemented in software, hardware, or on a combination thereof.

Additional features and advantages of the invention are set forth in the description that follows, and in part are apparent from the description, or may be learned by practice of the invention. The objectives and other advantages of the invention are realized and gained by the structure particularly pointed out in the written description and claims thereof as well as the appended drawings.

Although particular embodiments of the invention have been shown and described, it will be understood that it is not intended to limit the invention to the embodiments described above and it will be obvious to those skilled in the art that various changes and modifications may be made without departing from the spirit and scope of the invention. Thus, the invention is intended to cover alternatives, modifications, and equivalents, which may be included within the spirit and scope of the invention as defined by the claims.

What is claimed is:

1. A system for increasing data transfer rates in a network comprising:

a networked server device protected by a firewall and having a plurality of communication ports, wherein the plurality of communication ports comprise a communication port that receives connection requests through an existing opening in the firewall, the networked server device comprising:

a control process component configured to:

(a) listen for the connection requests on the communication port, (b) in response to a first connection request from a first client via the communication port, establish a first connection to the first client on the communication port, (c) in response to a second connection request from the first client via the communication port, establish a second connection to the first client on the communication port, and (d) cause data to be transmitted using the first connection on the communication port and the second connection on the communication port; and a relay process component configured to:

(i) receive, from the control process component, a first transferred connection, wherein the first transferred connection is transferred from the first connection, wherein the relay process component manages the first transferred connection on the communication port, (ii) receive, from the control process component, a second transferred connection from the control process component, wherein the second transferred connection is transferred from the second connection, wherein the relay process component manages the second transferred connection on the communication port, (iii) establish a first relay connection internal to the firewall to one or more server processes, wherein the relay process component relays first communication between the one or more server processes and the first client via the first transferred connection on the communication port and the first relay connection, whereby the firewall uses the existing opening in the firewall to facilitate the first communication between the first client and the one or more server processes, and (iv) establish a second relay connection internal to the firewall to the one or more server processes, wherein the relay process component relays second communication between the one or more server processes and the first client via the second transferred connection on the at least one communication port and the second relay connection, whereby the firewall uses the existing opening in the firewall to facilitate the second communication between the first client and the one or more server processes.

2. The system of claim 1, wherein the first relay connection is established on one or more first communication ports, whereby the firewall need not be aware of communication protocols used to establish the first relay connection on the one or more first communication ports as a result of the first relay connection being internal to the firewall.

3. The system of claim 2, wherein the second relay connection is established on one or more second communication ports, whereby the firewall need not be aware of communication protocols used to establish the second relay connection on the one or more second communication ports as a result of the second relay connection being internal to the firewall.

4. The system of claim 3, the control process component further configured to:

in response to a first request by the first client, via the first connection, to initiate a number of connections for communication, inform the one or more server processes of the first request for the number of connections;

receive a response from the one or more server processes, the response including a list of ports among the plurality of ports that are available for communication, wherein a number of ports among the list of ports corresponds to the number of connections requested by the first client;

and communicate the list of ports to the first client.

5. The system of claim 4, the control process component further configured to:

in response to second request by the first client, via the first connection, to connect to a particular port among the list of ports, inform the relay process component of the particular port requested by the first client, wherein the relay process component establishes the first relay process on the particular port.

6. The system of claim 5, wherein the relay process component relays data in parallel between the one or more server processes and the first client on the first transferred connection at the server on the communication port and the second transferred connection at the server on the communication port.

7. The system of claim 1, wherein the control process component accepts the first connection and the second connection in response to at least two requests from the first client to be connected to the one or more server processes, the at least two requests from the first client received by the control process component on the communication port at the server.

8. The system of claim 1, wherein the first connection is transferred to the first transferred connection by inheritance, and wherein the second connection is transferred to the second transferred connection by inheritance.

* * * * *